US005535435A

United States Patent [19]

Balzano et al.

[11] Patent Number: 5,535,435

[45] Date of Patent: Jul. 9, 1996

[54] COMMUNICATION DEVICE USING ANTENNA HAVING AN OFFSET

[75] Inventors: Quirino Balzano; Scott H. Richards, both of Plantation; Bruce A. Claxton, Coral Springs, all of Fla.

[73] Assignee: Motorola, Inc., Schaumburg, Ill.

[21] Appl. No.: 272,472

[22] Filed: Jul. 11, 1994

[51] Int. Cl.[6] .......... H04B 1/38

[52] U.S. Cl. .......... 455/89; 455/90; 455/129; 343/702

[58] Field of Search .......... 455/89, 90, 129; 343/702; 379/58, 59, 61

[56] References Cited

U.S. PATENT DOCUMENTS

| | | | |
|---|---|---|---|
| 4,138,681 | 2/1979 | Davidson et al. | 343/702 |
| 5,337,061 | 8/1994 | Pye et al. | 455/89 X |

FOREIGN PATENT DOCUMENTS

| | | |
|---|---|---|
| 0508299 | 4/1992 | European Pat. Off. . |
| 2702324 | 9/1994 | France . |
| 4-127723 | 4/1992 | Japan . |

*Primary Examiner*—Chi H. Pham
*Attorney, Agent, or Firm*—M. Mansour Ghomeshi

[57] ABSTRACT

A radio communication device (100) includes an offset antenna (104) and a housing (101). The offset antenna (104) includes an offset portion (108) and radiating portion (116). The antenna (104) is coupled to the radio housing (101) through a pivot mechanism (106) so that the antenna could rotate from a stowed position (114) to a deployed position (112). In the deploy position (112), the antenna is away from the user, a distance equal to the sum of the width (110) and the offset portion (108). This separation of the antenna from the body provides for significant improvement in the antenna performance.

18 Claims, 3 Drawing Sheets

COMMUNICATION DEVICE USING ANTENNA HAVING AN OFFSET

TECHNICAL FIELD

This invention is generally related to antennas and more particularly to antennas used with portable communication devices.

BACKGROUND

Portable communication devices, such as cellular telephones generally use a vertically mounted antenna for the transmission and reception of radio frequency signals. Several types of antennas, such as half-wave and quarter-wave are presently used with such devices. A problem with present antennas is the capacitive and inductive coupling to the body of the user. This body coupling degrades the performance of the antenna, and ultimately the communication device, due to reflection, diffraction and dissipation by the Joule effect of the RF (Radio Frequency) energy by the body of the user. A very common antenna is the quarter-wave whip and physically shorter quarter-wave antenna which is popular due to its size. The radiation patterns of quarter-wave antennas tend to have a deep null behind the head of the person holding the radio. The closer the radio is held to the body the deeper this null. Since some radio applications demand that the user hold the radio to their ear, e.g. cellular phones, the designer is forced to compromise the performance of the radio in order to achieve the device's intended use.

It is desired to have an antenna that overcomes the performance problems of the prior art without sacrificing the convenience of use.

DETAILED DESCRIPTION OF THE PREFERRED EMBODIMENT

Figure 1:
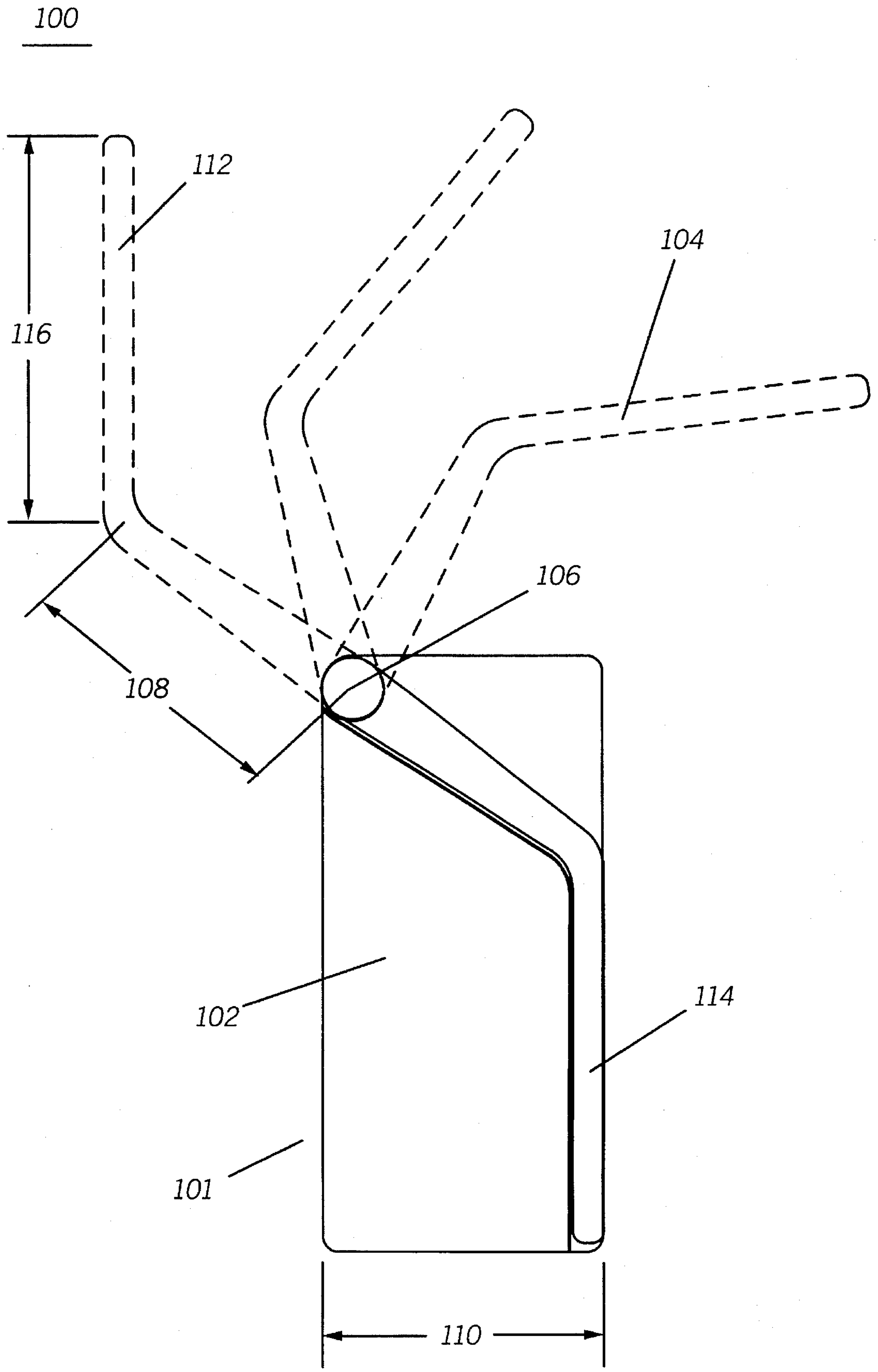
FIG. 1 shows a radio communication device 100 in accordance with the present invention.

Referring to FIG. 1, a radio communication device 100 in accordance with the present invention is shown. The radio 100 is used for the transmission and reception of radio frequency signals. An offset antenna 104 provides the means for receiving and transmitting the signals. The radio 100 includes a housing 101 that accommodates the circuitry of the transmitter and the receiver. The housing 101 includes two major surfaces. One major surface 102 includes a width 110 and is used by the antenna 104 as a resting area. The other surface 206 will be described in association with FIG. 2. The antenna 104 includes a deployed or active position as shown by 112 and a stowed or inactive position as shown by 114. The coupling between the antenna and the housing is accomplished via a pivot mechanism 106 that allows the antenna 104 to rotate a distance, namely 180 degrees between its fully deployed position 112 and its resting position 114. The surface 102 may be contoured to integrate the antenna 104 into the overall form of the radio 100 in its stowed position.

Figure 2:
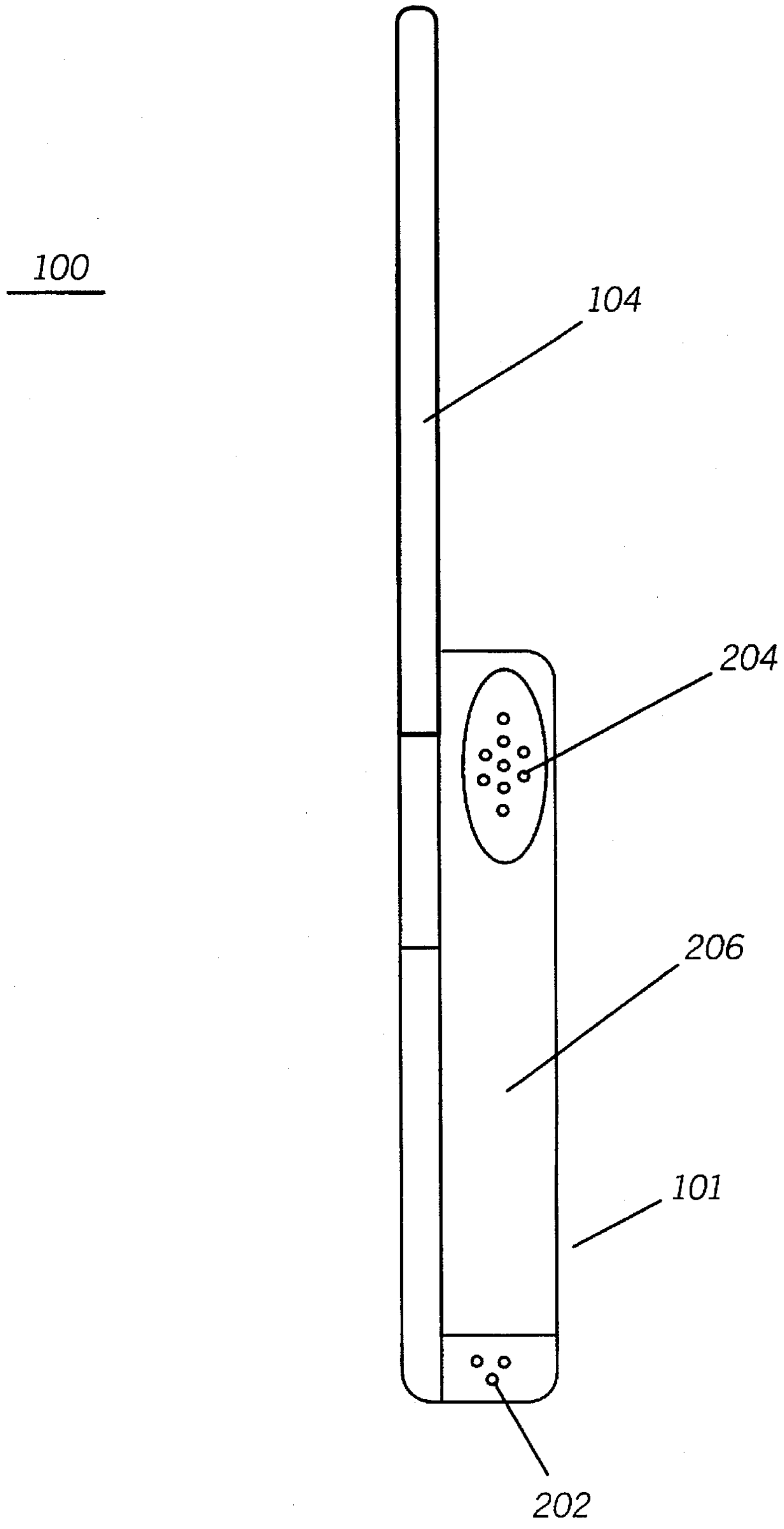
FIG. 2 shows a side view of the radio of FIG. 1.

In general, the antenna 104 includes first and second ends connected to each other via a radiating portion 116 and an offset portion 108. It is at the second end that the offset portion 108 is coupled to the radio via the attachment means 106. In the transmit mode, the antenna 104 is rotated out of its resting (stowed) position 114 to its fully deployed position 112. In so doing, the antenna will be away from the first major surface 206 (FIG. 2) by a distance equal to the sum of the offset portion 108 and the width of the radio 110. It is noted that the location of the attachment point 106 where the radio housing 101 is attached to the antenna 104 is critical in order to result in a maximum offset. As depicted in FIG. 1, this attachment point 106 is located in a corner of the surface 102 which is furthest away from the surface 206 (FIG. 2). This location is critical as the distance between the first surface 206 and the attachment point 106 is added to the length of the offset portion 108. In other words, the location of the attachment point 106 is chosen to result in the maximum offset between the radiating portion 116 and the surface 206 when the antenna is deployed.

In the preferred embodiment, the radiating portion 116 is a vertical section that is longer than the offset portion 108. The offset antenna 104 may take one of many several shapes, such as a dogleg shape, an L shape, a curved or a tapered antenna. Indeed, any antenna with a bent portion that could function as an offset may be suitable. The objective is to afford the radiating portion 116 a distance away from the surface 206, hence the user, in order to improve antenna performance. The kind of radiator used for 116 may be any of the sleeve dipole antennas or any antenna known in the art, such as end-fed, e.g. end-fed half-wave dipoles. It is noted that the offset portion 108 could include a choke 405 to prevent radio frequency currents from returning to the radio communication device from the radiating portion 116 These currents are unwanted because they are dissipated in the hand and the face of the user thus increasing the net RF power loss.

To increase the offset 108, several schemes including telescopic features may be employed. A telescopic assembly at the junction of the offset section 108 and the radiating section 104 would allow the user to manually improve the performance of the antenna. In addition, the radiating portion 104 may include a telescopic feature for improved radiation.

Referring to FIG. 2, a side view of the radio communication device 100 in accordance with the present invention is shown. This view reveals some details about the first surface 206. A microphone opening 202 is located in the lower section complemented by a speaker opening 204 on the top. Similar to a cellular telephone or a two way portable device the microphone opening 202 and the speaker opening 204 are appropriately located next to the position of the mouth and the ear, respectively, of the user. In such a fashion, the antenna radiating portion 116 will be away from the user by a distance equal to the width 110 and offset 108 so as to minimize pattern distortion and radiation loss from the body presence. In addition, this offsets minimizes the null that is created behind the user when quarter-wave or short antennas are used.

Figure 3:
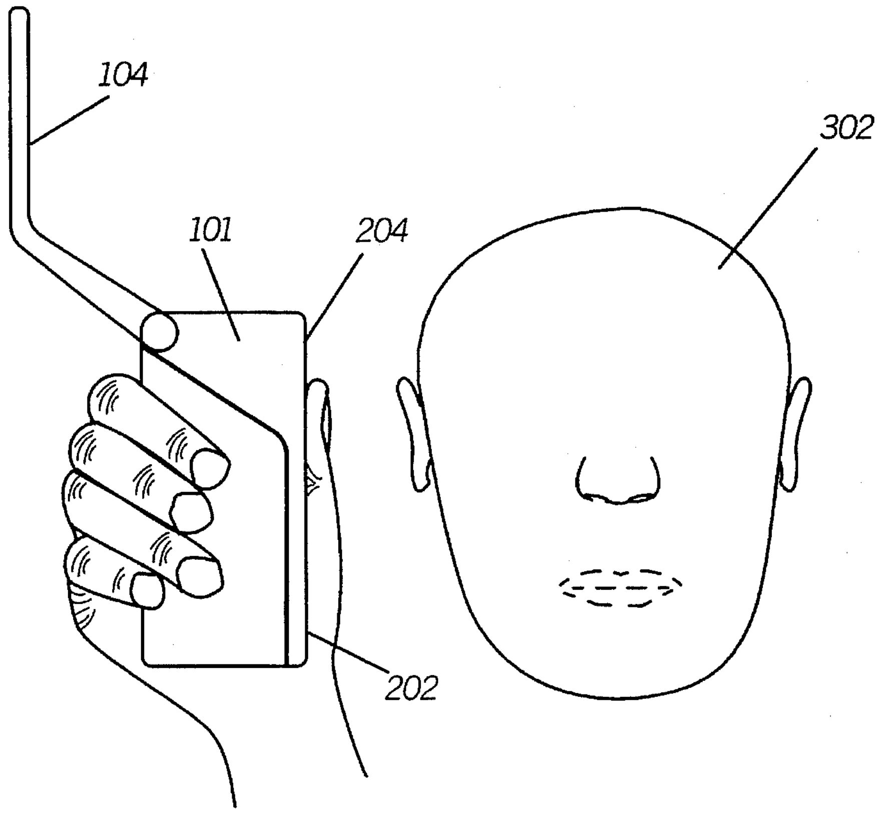
FIG. 3 shows a communication device in accordance with the present invention.

This feature is better visualized by referring to FIG. 3, where the position of the radio 100 in association with the user is illustrated. As can be seen from this figure, the antenna 104 is away from the body as illustrated by 302 in order to minimize the effect of body capacitance on the radiation of the antenna 104.

The reduction in the interference from the body capacitance results in a more efficient transmitter. In the preferred embodiment, the antenna 104 is chosen to perform optimally in the transmit mode. This helps designers in minimizing nulls and the effects of body RF dissipation in the mode with greatest power consumption. To accommodate for the reception of signals, a second antenna may be used that may function either independent of or along with the antenna 104. In the latter, the second antenna must be so designed to operate with the antenna 104 both in the stowed position and the deployed position.

Figure 4:
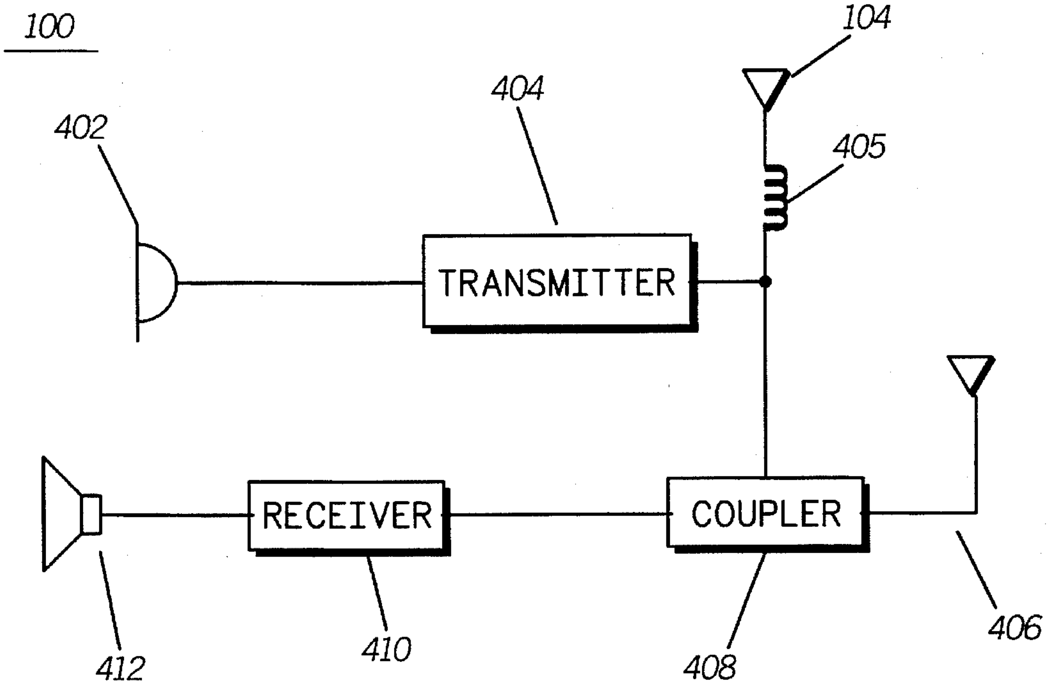
FIG. 4 shows the holding position of the radio 100.

Referring to FIG. 4, a block diagram of a communication device is shown. The transmitter 404 is used for the transmission of signals received through a microphone 402. A receiver 410 couples received signals to a speaker 412. The microphone 402 is located behind the microphone opening 202 while the speaker 412 is located behind the speaker opening 204. The antenna 104 is coupled to the transmitter 404 directly and to the receiver 410 through a coupler 408. This coupler 408 provides for the coupling of a second antenna 406 to the receiver 410. The antenna 406 is a receiver optimum antenna that in conjunction with the antenna 104 provides for an optimum reception of radio frequency signals if necessary, when the radio is located against the body with the antenna folded. It is noted that although a second antenna may be used for optimum performance in the receive mode, it is feasible to design the antenna 104 to provide sufficient reception when in the stowed position 114 or the deployed position 112. In such a fashion, the need for the second antenna 406 is eliminated.

In summary, a radio communication device having an offset antenna has been disclosed. The antenna includes an offset portion and a radiating portion and is coupled to the radio through a pivot that provides for its rotation from its stowed position to a fully deployed position. When in the deployed position, the antenna is away from the user by a distance equal to twice the width of the radio. This separation between the user and the antenna provides for improved performance of the antenna.

What is claimed is:

1. A radio communication device having a transmit mode and a receive mode of operation, comprising:

a housing having a first major surface, a second surface, a width, and a microphone located on the first major surface;

a transmitter substantially situated within the housing;

an antenna having a deployed position and a second position and being pivotally coupled to the housing and comprising:

a radiating portion;

an offset portion coupled to the radiating portion; and attachment means for pivotally attaching the offset portion of the antenna to the housing so that the radiating portion is away from the housing in a plane parallel to the first major surface a distance substantially equal to the length of the offset portion when in the deployed position and resting on the second surface of the housing when in the second position.

2. The radio communication device of claim 1, wherein radiating portion includes a vertical section longer than the offset portion.

3. The radio communication device of claim 1, wherein the offset portion includes a length equal to the width of the housing.

4. The radio communication device of claim 1, wherein the antenna includes a dog leg shaped antenna.

5. The radio communication device of claim 1, wherein the antenna includes a sleeve dipole antenna.

6. The radio communication device of claim 1, wherein the antenna includes an end-fed antenna.

7. The radio communication device of claim 1, further including a second antenna for providing the radio communication device with optimum performance in the receive mode.

8. The radio communication device of claim 7, wherein the first antenna includes means for providing the radio communication device with optimum performance in the receive mode when the first antenna is in the second position.

9. A radio communication device, comprising:

a housing having first and second major surfaces;

a transmitter substantially situated within the housing;

a receiver substantially situated within the housing;

a microphone opening located on the first major surface;

a first antenna having an active position and an inactive position, the first antenna comprising:

an antenna body having an offset section with a length;

attachment means for pivotally attaching the offset section of the first antenna to the housing whereby the first antenna is away from the first major surface in a plane parallel to the same at least a distance equal to the length of the offset section when it is in the active position in order to improve the radio frequency (RF) performance of the first antenna and rests on the second major surface when in the inactive position; and a second antenna for providing the receiver with reception of a radio frequency signal when the first antenna is in the second position.

10. The radio communication device of claim 9, wherein the first antenna includes an L shape antenna.

11. The radio communication device of claim 9, wherein the first antenna includes a dog leg shaped antenna.

12. The radio communication device of claim 9, wherein the first antenna includes a tapered antenna.

13. The radio communication device of claim 9, wherein the first antenna includes a transmit optimum antenna.

14. The radio communication device of claim 9, wherein the offset section of the first antenna includes a choke to prevent RF from returning to the radio communication device.

15. A radio communication device, comprising:

a transmitter for generating a transmit signal;

a housing for accommodating the transmitter, the housing having first and second major surfaces;

a microphone opening located on the first major surface;

a rotatable antenna coupled to the transmitter, the antenna having a deployed position away from the first major surface in a plane parallel to the same for providing the radio with optimum transmission of the transmit signal and a stowed position on the second major surface, the antenna comprising:

an L shaped body;

attachment means for rotatably attaching the antenna to the housing at a corner on the second major surface and away from the first major surface so that when the antenna is in the deployed state it is furthest away from the first major surface and it is closest to the first major surface when in the stowed state.

16. The radio communication device of claim 15, further including a receiver.

17. The radio communication device of claim 16, further including a second antenna coupled to the receiver.

18. The radio communication device of claim 16, further including a second antenna coupled to the rotatable antenna for providing the receiver with optimum performance.

* * * * *